United States Patent [19]

Kaneko et al.

[11] Patent Number: 5,136,659
[45] Date of Patent: Aug. 4, 1992

[54] INTELLIGENT CODING SYSTEM FOR PICTURE SIGNAL

[75] Inventors: Masahide Kaneko, Kokububji; Yoshinori Hatori, Kawasaki, both of Japan

[73] Assignee: Kokusai Denshin Denwa Kabushiki Kaisha, Tokyo, Japan

[21] Appl. No.: 529,244

[22] Filed: May 25, 1990

Related U.S. Application Data

[63] Continuation-in-part of Ser. No. 210,627, Jun. 23, 1988, abandoned.

[30] Foreign Application Priority Data

Jun. 30, 1987 [JP] Japan .................................. 62-161353

[51] Int. Cl.⁵ ..................................................: G06K 9/00
[52] U.S. Cl. .......................................... 382/16; 382/2; 382/25; 382/28
[58] Field of Search ..................... 382/2, 1, 25, 18, 28, 382/19, 16; 358/467, 470, 452, 453; 364/513, 513.5

[56] References Cited

U.S. PATENT DOCUMENTS

4,841,575 6/1989 Welsh et al. ............................ 382/2

Primary Examiner—Michael Razavi
Attorney, Agent, or Firm—Emmanuel J. Lobato; Robert E. Burns

[57] ABSTRACT

An intelligent coding system for a picture signal is disclosed, in which a feature picture representing features of a picture is produced on the basis of an input picture signal, information of the position and the shape of each element forming the picture is extracted from the feature picture and then the information thus extracted is organized concisely by a small number of parameters. According to another aspect of the present invention, consistency (or continuity) of variations in the position and the shape of each element can be held throughout a continuation of frames of motion picture signals.

3 Claims, 8 Drawing Sheets

INTELLIGENT CODING SYSTEM FOR PICTURE SIGNAL

CROSS REFERENCE TO RELATED APPLICATION

The present application is a continuation-in-part of an application of Ser. No. 07/210,627 filed on Jun. 23, 1988 and now abandoned.

BACKGROUND OF THE INVENTION

The present invention relates to a coding system for more particularly, to a system for coding motion picture signal, such as a television signal, basically by the procedures of analyzing the contents and features of the motion picture signal, concisely presenting the results of analysis through the use of parameters, and producing a motion picture on the basis of the above parameters.

As a picture signal coding method for transmitting or signal, there has been employed a waveform coding method in which information representing the luminance and chrominance variations of the picture is obtained, as waveform information, by sequentially scanning the screen, and the scanned waveform is coded as faithfully as possible. In concrete terms, predictive coding, orthogonal transform coding and coding utilizing vector quantization are well-known in the art. The waveform coding method basically calls for coding the luminance and chrominance variations of picture elements which form the picture, and the existing coding technology needs an amount of information more than dozens of kilobits per second for coding the motion picture signal.

On the other hand, there has recently been presented, as a picture coding method entirely different from the waveform coding, a general idea of a novel coding method commonly referred to as intelligent coding or analysis/synthesis coding. However, any concrete example for actually performing such a novel coding method have not yet been proposed.

SUMMARY OF THE INVENTION

It is a primary object of the present invention to provide a concrete method for implementing intelligent coding of a picture signal, in particular, an intelligent coding system for a picture signal in which information for synthesizing a picture is effectively extracted from an input picture signal and is coded.

According to an aspect of the present invention, a feature picture representing features of a picture is produced on the basis of an input picture signal, information of the position and the shape of each element forming the picture is extracted from the feature picture and then the information thus extracted is organized concisely by a small number of parameters. According to another aspect of the present invention, consistency (or continuity) of variations in the position and the shape of each element can be held throughout a continuation of frames of motion picture signals.

BRIEF DESCRIPTION OF THE DRAWINGS

The present invention will be described in detail below in comparison with prior art with reference to the accompanying drawings, in which.

DETAILED DESCRIPTION

To make differences between prior art and the present invention clear, an example of prior art will first be described.

Figure 1:
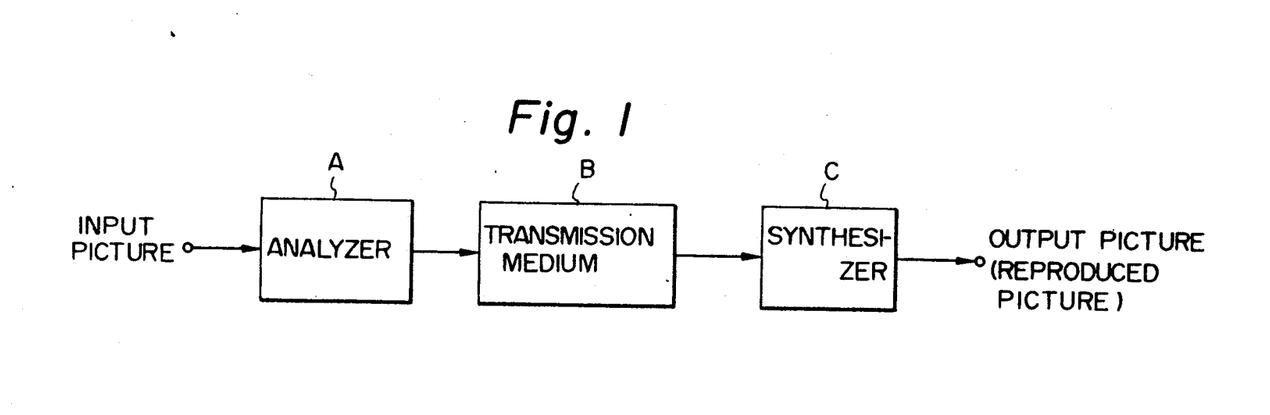
FIG. 1 is a block diagram showing a general idea of intelligent coding of a picture signal.

FIG. 1 is a block diagram conceptually showing the general arrangement of conventional intelligent coding. In FIG. 1 reference character A indicates an analyzer, B a transmission medium for the results of analysis, and C a synthesizer. Let consider a digitized picture as an input picture. The analyzer A makes an analysis of the input picture and extracts its features for representing the picture. The medium B transmits the results of analysis obtained in the analyzer A to the synthesizer C. The synthesizer C synthesizes a picture corresponding to the input picture through utilization of the results of analysis transmitted thereto. With the use of such a method, picture change information in the motion picture signal can be coded as a change in the value of a feature representing para meter. This permits representing motion picture information with an amount of information, for example, less than 1/10 that needed in the conventional waveform coding. Furthermore, a motion picture corresponding to an arbitrary motion could be created by arranging the feature representing parameter as required.

With respect to intelligent coding, such a basic idea as mentioned above has been presented but any specific methods for implementing it are still unknown. Especially, it is necessary, for the production of a motion picture, to concretely clarify what information is needed and what method is used for obtaining it.

Incidentally, intelligent coding is conceptually of wide application but, for efficient and practical analysis and synthesis of the object to be coded, it is necessary to preknow its basic structure, shape and motion. Accordingly, in the practical application of this coding the object to be coded must be limited to some extent. The following description will be given of the coding of a head and shoulder picture of a person, taking into account the application of the intelligent coding to video telephone and other picture transmission services.

With reference to the accompanying drawings, the present invention will hereinafter be described in detail.

Figure 2:
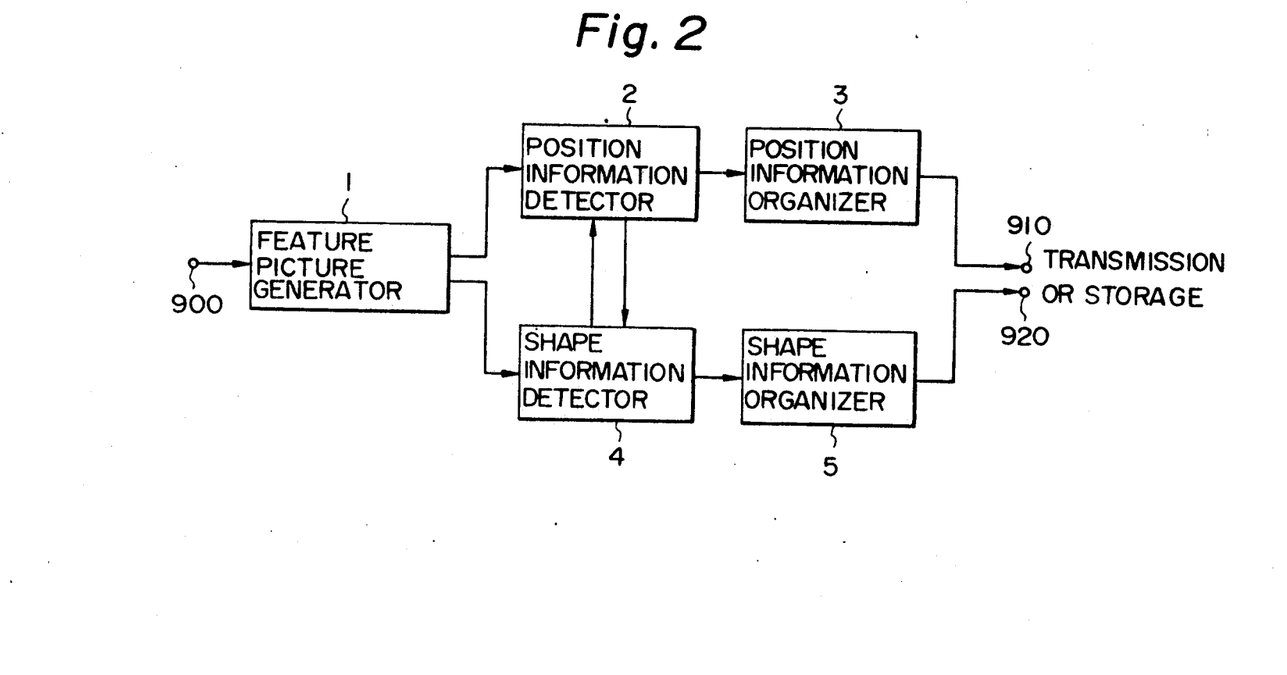
FIG. 2 is a block diagram corresponding to basic operations of the present invention.

FIG. 2 illustrates in block form an embodiment of the present invention which clarifies the arrangement of the analyser A in FIG. 1 which has not been established in the prior art. Let it be assumed that an input picture signal is a digital picture signal which is obtained by sampling and analog-to-digital conversion of a television signal available from a television camera or the like. In FIG. 2, reference numeral 1 indicates a feature picture generator, 2 a position information detector, 3 a position information organizer, 4 a shape information detector and 5 a shape information organizer. Reference numeral 900 identifies a terminal for receiving the digital picture signal, and 910 and 920 terminals for outputting position information and shape information available from the position information organizer 3 and the shape information organizer 5, respectively, these information being provided on a transmission line or stored in a storage.

Next, a description will be given of the operation of each section.

Figure 3:
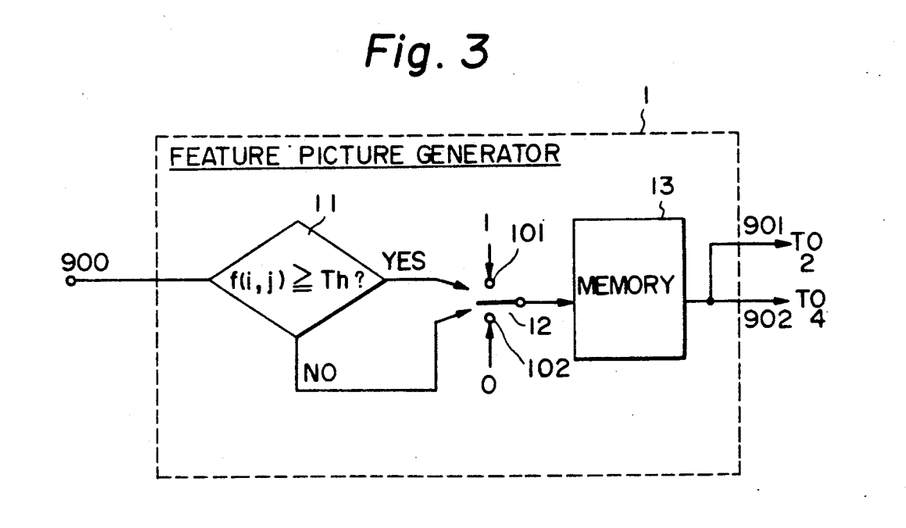
FIG. 3 is a block diagram illustrating an example of feature picture generator employed in the embodiment shown in FIG. 2; 1

FIG. 3 shows an example of the feature picture generator 1, in case of thresholding operation using a threshold value Th, which comprises a comparator 11, a switch 12, a memory 13, terminals 101, 102 for providing values "1" and "0", respectively, and output lines 901 and 902 for the position information detector 2 and the shape information detector 4, respectively. At the comparator 11, a picture element f(i,j) forming a digital picture is processed to obtain a decision under the following conditions:

when $f(i,j) \geq Th$, then $g(i,j) = 1$
when $f(i,j) < Th$, then $g(i,j) = 0$

Then, the switch 12 is connected to the terminal 101 or 102 in accordance with this result. A two-valued picture $G = \{g(i,j)\}$ obtained from the switch 12 is stored in the memory 13. As a threshold value Th, a predetermined value is used.

Figure 4A:
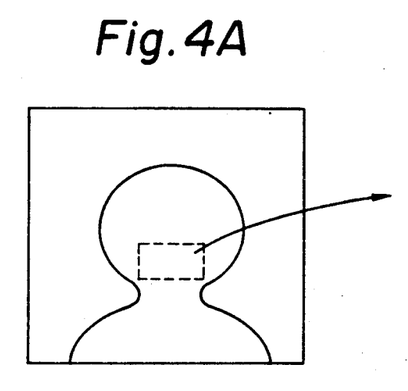
FIGS. 4A and 4B are schematic diagrams for explaining the operation of a feature picture generator employed in the present invention.
Figure 4B:
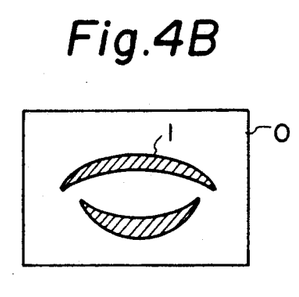

FIG. 4 shows an example of the two-valued picture obtained by subjecting the input picture to the thresholding operation. From a head and shoulder picture of a person shown in FIG. 4A a two-valued picture of the mouth, such as shown in FIG. 4B is obtained. This two-valued picture shows features of the object (the mouth in this case). It is also possible to extract features of eyes by the same thresholding operation. The production of the feature picture can also be achieved by a method which detects a portion of an abrupt change in luminance or chrominance, that is, an edge portion.

Feature picture generation by detecting an edge portion was described at "Chapter 10, Segmentation" of a Publication [A. Rosenfeld and A. C. Kak: "Digital Picture Processing (2nd ed.) Vol. 2," Academic Press, 1982]. In the following, since the invention will be described in case of the two-valued picture by way of example, details of the detection operation of an edge portion will be omitted. However, if the two-valued picture indicating an edge portion is obtained by applying the thresholding operation to a detection result of the edge portion, the succeeding operation can be applied to the obtained two-valued picture.

In the position information detector 2 and the shape information detector 4, information about the position and the shape of each element forming the picture is extracted on the basis of the feature picture from the feature picture generator 1.

Figure 6:
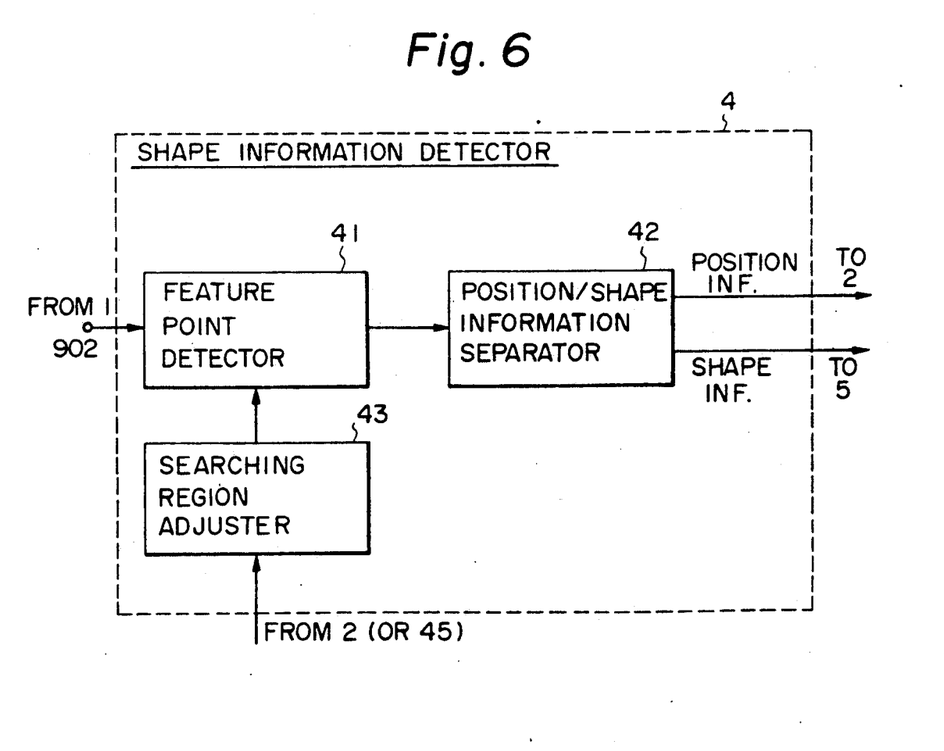
FIG. 6 is a block diagram illustrating an example of a shape information detector employed in the embodiment shown in FIG. 2.

An example of the shape information detector 4 is illustrated in FIG. 6, which comprises a feature point detector 41, a position/shape information separator 42 and a searching region adjuster 43. The operations of this example will be described with respect to a mouth portion by way of example, since other elements, such as eyes, can be described in the similar manner.

Figure 5A:
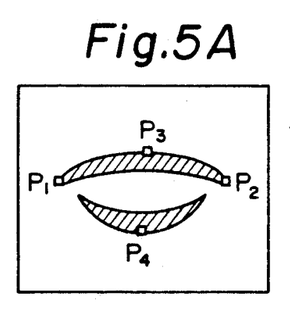
FIGS. 5A, 5B and 5C are schematic diagrams for explaining the operation of a shape information detector employed in the present invention.

In the feature point detector 41, feature points representative of the shape of the mouth portion are detected from the two-valued picture applied from the output line 902 of the feature picture generator 1. Four points $P_1$ to $P_4$ shown in FIG. 5A are selected as the feature points by way of example. In this case, the leftmost point $P_1$, rightmost point $P_2$, the uppermost point $P_3$ and the lowermost point $P_4$ of the mouth portion are selected as the four points, by which shapes of the mouth can be basically represented. If more feature points, such as midpoints between the above-mentioned feature points are further selected, more precise representation can be obtained.

Figure 7:
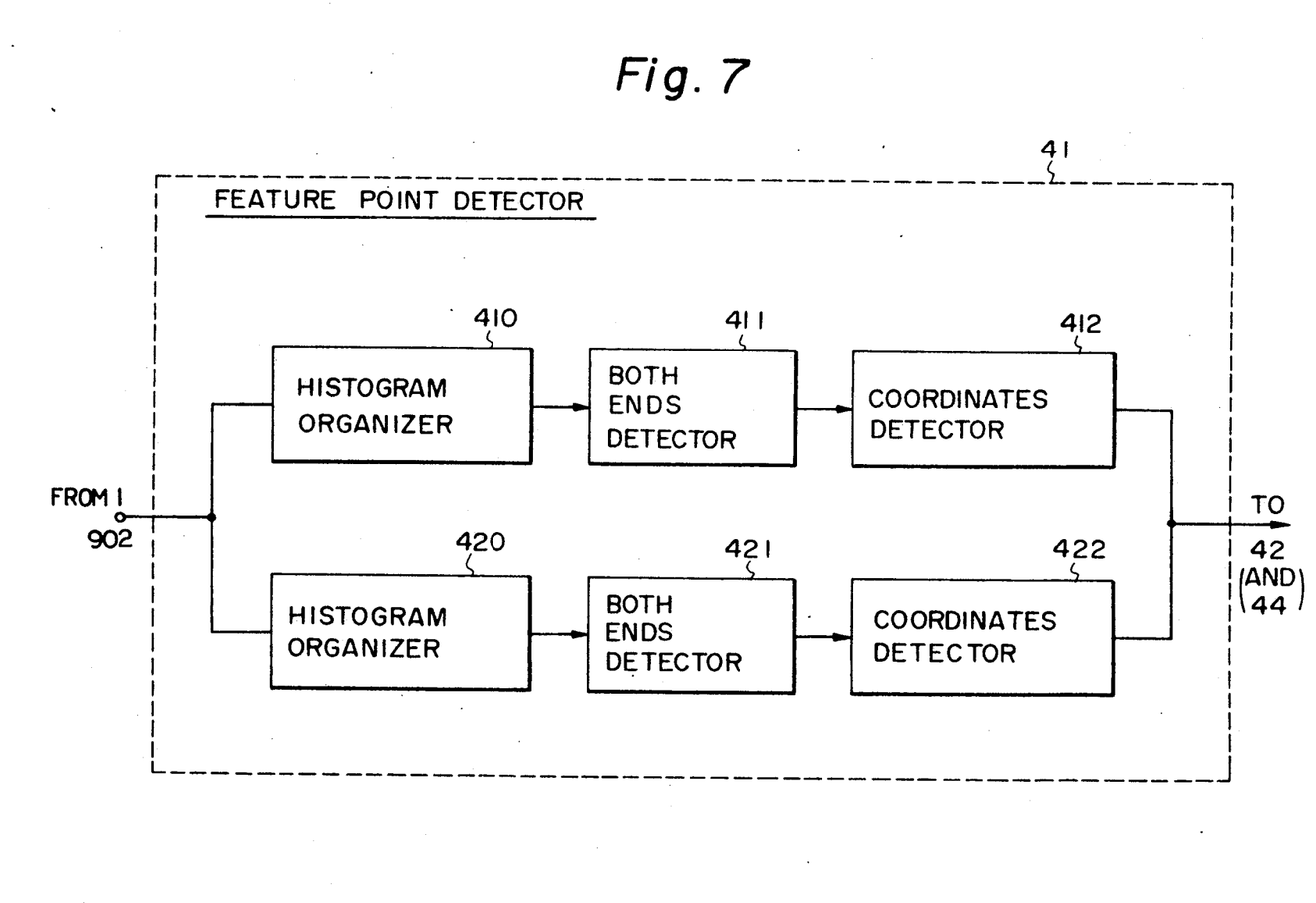
FIG. 7 is a block diagram illustrating an example of a feature point detector employed in the example shown in FIG. 6.

An example of the feature point detector 41 is illustrated in FIG. 7, which comprises histogram organizers 410 and 420, both ends detectors 411 and 421, and coordinates detectors 412 and 422. Units 410, 411 and 412 are employed for detecting the uppermost point and the lowermost point, while units 420, 421 and 422 are employed for detecting the leftmost point and the rightmost point.

Figure 8A:
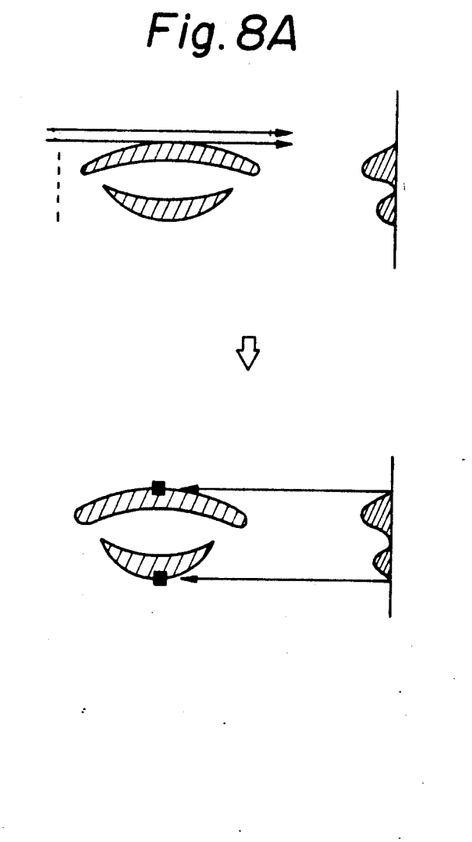
FIGS. 8A and 8B are schematic digrams explanatory of operations of the feature point detector.
Figure 8B:
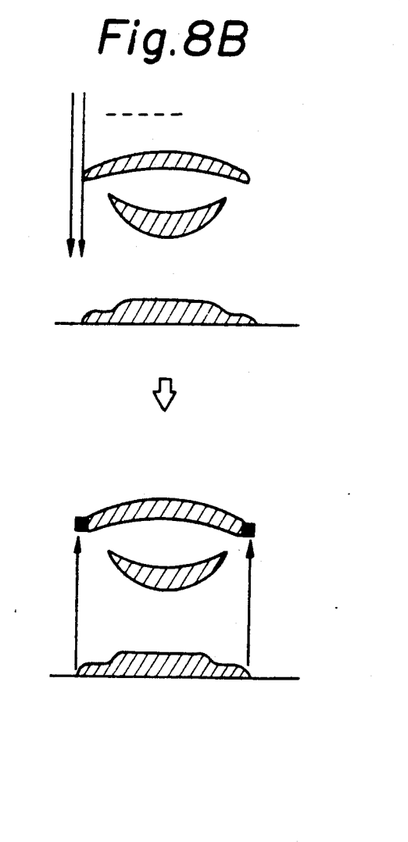

With reference to FIGS. 8A and 8B, processings on a two-valued picture will be described.

Figure 5B:
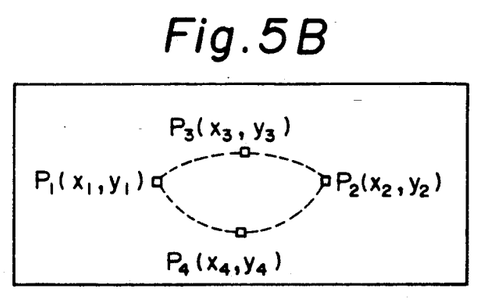
Figure 5C:
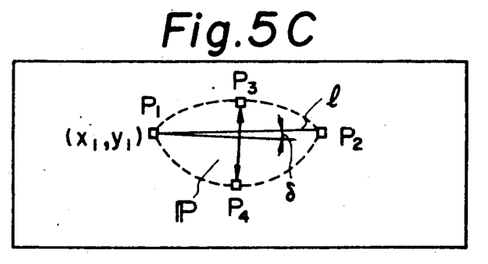

At first, the uppermost point and the lowermost point are detected. In the histogram organizer 410, the number of picture elements of value "1" is counted for each horizontal line as shown in FIG. 8A in a rectangular region established by the searching region adjuster 43 to produce a histogram. Two ends of a region having the calculated value of more than one on the produced histogram is then obtained in the both ends detector 411 as y-coordinates of the uppermost point and the lowermost point of the mouth portion. In the coordinates detector 412, positions of picture elements of the value "1" on horizontal lines corresponding to these y-coordinates are provided to determine x-coordinates of the uppermost point and the lowermost point of the mouth portion. If there are a plurality of picture elements of value "1" on the horizontal line, an average value of a group of picture elements of the value "1", which are positioned in the vicinity of an average value of the x-coordinates of the leftmost point and the rightmost point obtained in the both ends detector 421, is provided to obtain the x-coordinate of the uppermost point or the lowermost point. In a case of the leftmost point and the rightmost point, operations similar to those of the cases of the uppermost point and the lowermost point are carried out except that the counting of picture elements of the value "1" is performed in the vertical direction in case of providing a histogram as shown in FIG. 8B. As mentioned above, a set of space coordinates $(x_i, y_i)$ of feature points are obtained as shown in FIG. 5B from the feature point detector 41. However, such a set of coordinates is difficult to handle because information indicating the position and the size of each element and information indicating a change in the shape of each element are intermingled in the set. Then, in the position/shape information separator 42, the set of coordinates is separated into position information and shape information as depicted in FIG. 5C. In FIG. 5C z-coordinates indicating the depth of the picture are omitted for the sake of simplicity.

As shown in FIG. 5C, coordinates $(x_i, y_i)$ $(i=1,2,3,4)$ of the feature points can be handled after dividing them into the following two groups.

The following first group is employed for indicating the position, the size and the inclination of the mouth portion in the picture plane:

coordinate of a feature point $P_1$: $(x_1, y_1)$ length l of a distance $\overline{P_1P_2}$:

$$l = \sqrt{(x_2 - x_1)^2 + (y_2 - y_1)^2}$$

inclination $\delta$ of a line passing at points $P_1$ and $P_2$: from a horizontal line $$\delta = \tan^{-1}\{(y_2-y_1)/(x_2-x_1)\}$$

These are information peculiar to the mouth portion of each individual person and called as position information.

The following is a second group of parameter $\mathbb{P}$:

p .... $\overline{P_1C_o}:\overline{C_oP_2}$=p:1−p
q .... $\overline{P_3C_o}:\overline{C_oP_4}$=q:1−q
$\theta$ .... angle between lines $\overline{P_1P_2}$ and $\overline{P_3P_4}$
t .... $\overline{P_3P_4}$=t·l In this case, the notation $C_o$ indicates an intersection of lines $\overline{P_1P_2}$ and $\overline{P_3P_4}$.

These parameters represent the degree of opening and distortion of the mouth portion and are called as shape information. A group of information $(x_1, y_1)$, l, $\delta$, p, q, $\theta$, and t and a group of information $(x_i, y_i)$ $(i=1,2,3,4)$ can be mutually converted. The position information is information peculiar to each element, that is, information whose value varies when a different person appears or when the size of the person changes in the picture. The shape information represents the degree of relative variations in shape as understood from the above definition and can be used even if a different person appears or even if the size of the person in the picture changes. In this instance, however, different parameter groups are required for respective elements such as the mouth and eyes.

The searching region adjuster 43 is employed for establishing a rectangular processing region in case of the above-mentioned processing in the feature point detector 41. A rough center position $(x_M, y_M)$ of the mouth portion is obtained from the position information detector 2 as mentioned below, so that a rectangular region determined by a left-upper corner $(x_M-m/2, y_M-n/2)$ and a right-lower corner $(x_M+m/2, y_M+n/2)$ is established in accordance with a predetermined size of rectangular region m·n and the obtained center position.

Figure 9:
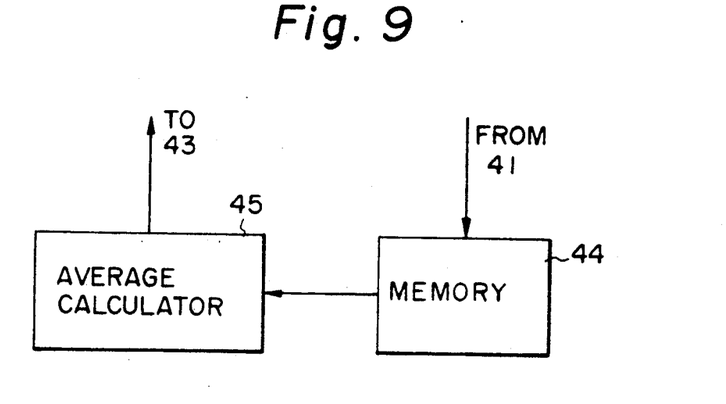
FIG. 9 is a block diagram illustrating an example of a part which calculates a value giving to a searching region adjuster employed in the example shown in FIG. 6.

An example of the searching region adjuster 43 is illustrated in FIG. 9, which comprises a memory 44 and an average calculator 45, in case of obtaining the center position $(x_M, y_M)$ with no use of the position information detector 2. The memory 44 stores, during at least one frame, the coordinates $(x_i, y_i)$ of feature points in the immediately preceding frame obtained from the feature point detector 41. The average calculator 45 provides an average of the coordinates of feature points from $$x_M = \frac{1}{4} \sum_{i=1}^{4} x_i$$

$$y_M = \frac{1}{4} \sum_{i=1}^{4} y_i$$

If the obtained coordinates $(x_M, y_M)$ are applied to the searching region adjuster 43, the rectangular processing region can be established as mentioned above.

The position information detector 2 receives position information of each element from the shape information detector 4. Prior to this, in case of necessary, the position information detector 2 detects the position of the face portion in the picture on the basis of the feature picture available from the feature picture generator 1 and, further, roughly detects the positions of elements, such as the mouth, eyes and so on. The shape information detector 4 performs the above-described processing on the basis of such roughly detected positions.

Figure 10:
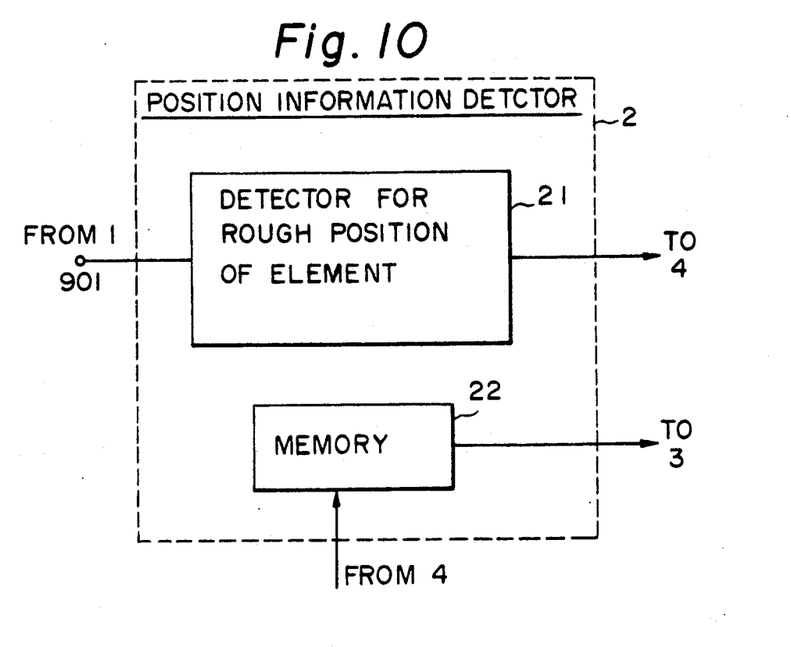
FIG. 10 is a block diagram illustrating an example of a position information detector employed in the embodiment shown in FIG. 2.

With reference to FIG. 10, an example of the position information detector 2 comprises a detector 21 for rough position of element and a memory 22. The detector 21 for rough position of element is unnecessary in a case where the rough position of mouth or eyes in the picture plane is previously known. On the contrary, if the rough position thereof is previously unknown, the detector 21 is necessary to perform detection processing of feature points in at least the first frame. Since the center position $(x_M, y_M)$ of the mouth portion after the first frame can be obtained by way of example as a detected result of the feature points in the immediately proceding frame, the detector 21 is not always necessary. The memory 22 is employed for temporarily storing the position information applied from the shape information detector 4.

Figure 11:
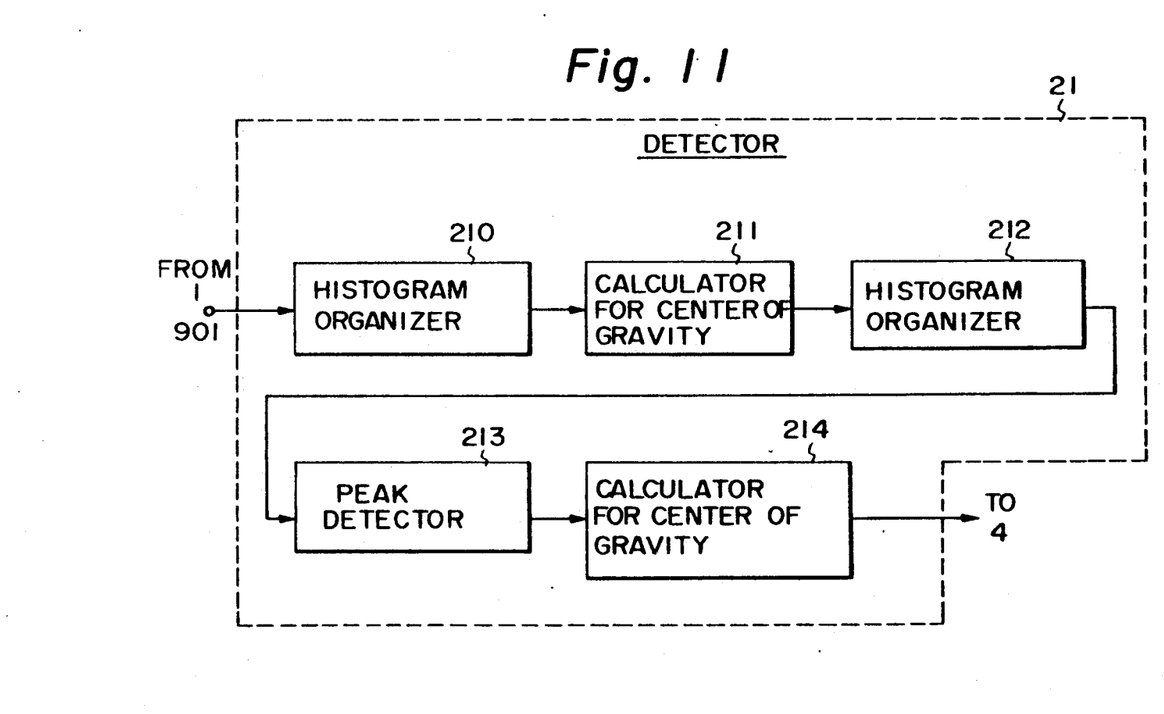
FIG. 11 is a block diagram illustration an example of a detector for rough position of element employed in the example shown in FIG. 10.

An example of the detector 21 will be described with reference to FIG. 11, which comprises histogram organizer 210 and 212, calculators 211 and 214 for center of gravity, and a peak detector 213. The histogram organizer 210 counts the number of picture elements of value "1" in a two-valued picture supplied from the feature picture generator 1 for each vertical line in a rectangular region, which is defined by a left-upper corner $(x_s, y_s)$ and a right-lower corner $(x_e, y_e)$ to obtain a required histogram. In this case, the values $x_s, y_s, x_e$ and $y_e$ establish a rough picture region including a face portion for a picture size $D_x \cdot D_y$, in a case where a distance between a camera and a person is constant while the face portion is viewed from the front side and positioned at the center of the picture region. These values are calculated as follows:

$$x_s = a_1 D_x \qquad y_s = b_1 D_y$$
$$x_e = D_x - a_2 D_x \qquad y_e = D_y - b_2 D_y$$

Symbols $a_1$, $a_2$, $b_1$ and $b_2$ are predetermined coefficients ranging from 0 to 1.

Therefore, the position of center of gravity of the histogram is calculated in the calculator 211 for center of gravity. In view of the right-left symmetricity of the face portion, the vertical line passing at the evaluated center of gravity is positioned about at the center line of the face position, so that a rough center position $x_M$ of the mouth portion in the horizontal direction is obtained. In the histogram organizer 212, the number of picture elements of value "1" is counted for each horizontal line in a region of width $r \cdot (x_e - x_s)$ along the center line to provide a histogram, where the coefficient r is predetermined in a range of 0 to 1. In the peak detector 213, a peak value $y_M$ is obtained in the histogram so as to exceed a predetermined value $Th_p$ from the lower end (chin). If adjacent two peaks are obtained in correspondence to upper and lower lips, respectively, an average of the adjacent two peaks is determined as the value $y_M$. In combination to the abovementioned value $x_M$, the rough center position $(x_M, y_M)$ of the mouth portion is thus obtained.

The position information organizer 3 organizes, as numerical data, the position information obtained in the position information detector 2. The position information includes numerical values such as coordinate values $(x_1, y_1)$, size (l), angle ($\delta$), and so on. The position information organizer 3 organizes these numerical values as they are by the use of the number of bits necessary for digits of the accuracy obtained by the above detection operation, or organizes them more concisely through utilization of quantization or variable length coding.

In this case, quantization is employed to indicate a value of m bits by the use of n bit ($n<m$), so that the number of bits (i.e. amount of information) for indicating a value can be reduced. This technique was known as described in a Publication [A. Rosenfeld and A. C. Kak: "Digital Picture Processing (2nd ed.) Vol. 1", Academic Press, 1982, pp 106–113]. On the other hand, Variable Length Coding is a technique for reducing the number of bits (i.e. amount of information) indicative of a value by assigning short bit strings and long bit strings to values of high occurrence rate and values of low occurrence rate, respectively. An example of this Variable Length Coding was described on a Publication [D. A. Huffman: "A method for the construction of minimum redundancy codes", Proc. IRE, Vol 40, 1962, pp 1098–1101]. Details of the quantization and the Variable Length Coding are omitted since these are well-known techniques and are not essential for the present invention.

The shape information organizer 5 organizes, as numerical data, the shape information obtained in the shape information detector 4. As the shape information, the shape itself of the object such as its contour line can be used, but in a case where the object is limited to a mouth, an eye, or the like it is also possible to extract feature points representing the shape of the object and to use parameters obtainable from the feature points, as described previously. The shape information organizer 5 organizes, likely to the above-mentioned position information organizer 3, these parameters as they are or in a more concise form through quantization or variable length coding.

Figure 12:
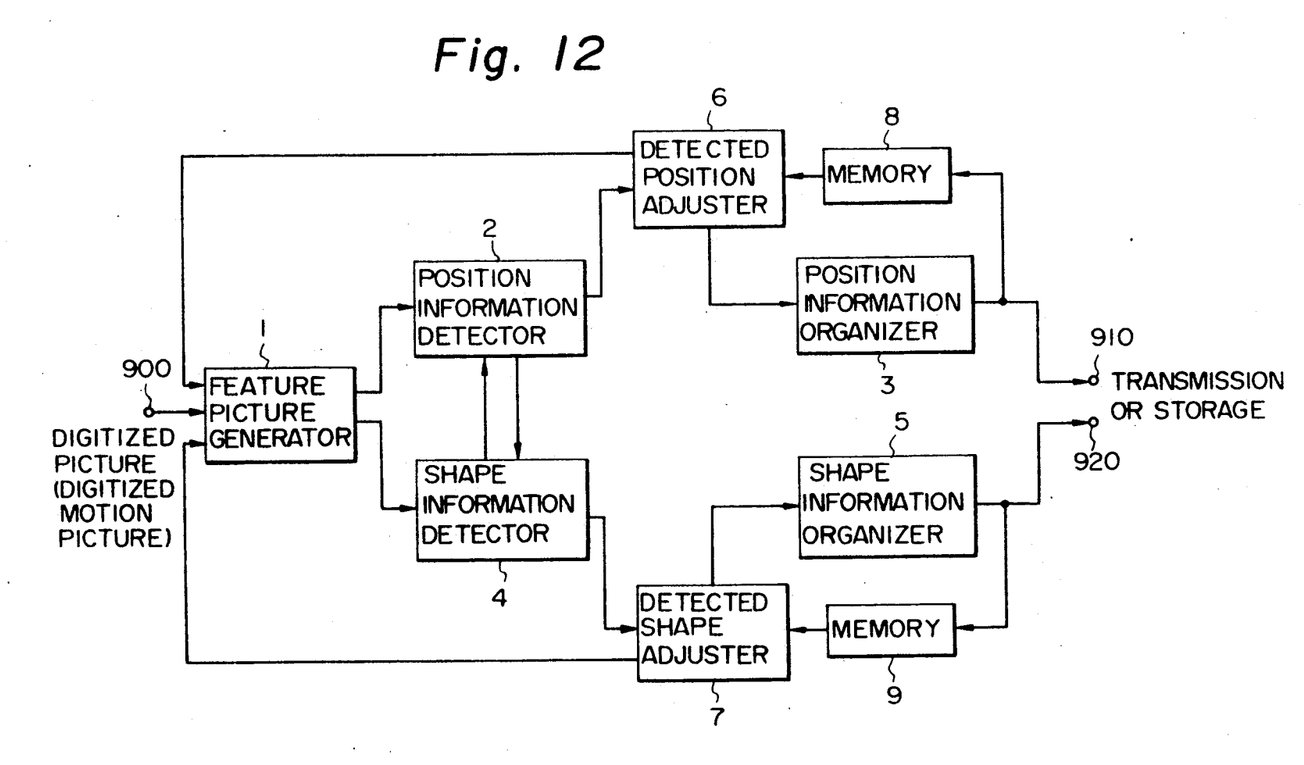
FIG. 12 is a block diagram corresponding to the operation of the present invention in the case of processing a motion picture signal.

FIG. 12 illustrates another embodiment of the present invention. In the application of the present invention to a motion picture signal such as a television signal, changes in the position or shape of each element must be maintained consistent (or continuous) for an extended series of frames. That is, the position or shape of each element may sometimes be erroneously detected due to noise or the like in individual frames. In such a case, each frame does not appear unnatural but changes in the position or shape of each element become discontinuous in a series of frames, impairing the naturalness as a motion picture. To prevent this, the embodiment of FIG. 12 includes some means in the arrangement of FIG. 2. In FIG. 12, reference numeral 6 indicates a detected position adjuster, 7 a detected shape adjuster, and 8 and 9 memories. The other sections are the same as those in FIG. 2.

Information about the position and the shape of each element, detected in each frame, is stored in the memories 8 and 9 for at least one frame period. The position information and the shape information of each element detected by the position information detector 2 and the shape information detector 4 in the current frame are supplied to the detected position adjuster 6 and the detected shape adjuster 7, respectively, wherein they are compared with the position information and the shape information of the corresponding element in the preceding frame or frames stored in the memories 8 and 9. Several methods can be used for evaluating the continuity of changes of each element. The simplest method is to determine whether or not the position $(x_{i-1}, y_{i-1})$ in the current frame satisfy the following conditions with respect to the position $(x_i, y_i)$ in the preceding frame.

$$x_{i-1} - \Delta x < x_i < x_{i-1} + \Delta x$$

$$y_{i-1} - \Delta y < y_i < y_{i-1} + \Delta y$$

In the above $\Delta x$ and $\Delta y$ represent predetermined premissible variations.

This is also similarly applicable to the above-mentioned parameters relating to position information and shape information of configuration other than coordinate information. Namely, the evaluation of the following inequalities are performed for a parameter e $$e_{i-1} - \Delta e < e_i < e_{i-1} + \Delta e$$

where notations $e_{i-1}$, $e_i$ and $\Delta e$ are a value of an immediately preceeding frame, a value of a current frame and a predetermined allowable deviation, respectively. In a case where the values $(x_i, y_i)$ and $e_i$ are met with the above conditional so that the values $(x_i, y_i)$ and $e_i$ are applied to the position information organizer 3 and the shape information organizer 5 as values of the current frame. However, if the values $(x_i, y_i)$ and $e_i$ are not met with the above conditional formula, the threshold value Th in the feature picture generator 1 is modified by a value $\Delta$Th to perform again the above operations starting from the position information detector 2 and the shape information detector 4.

Figure 13:
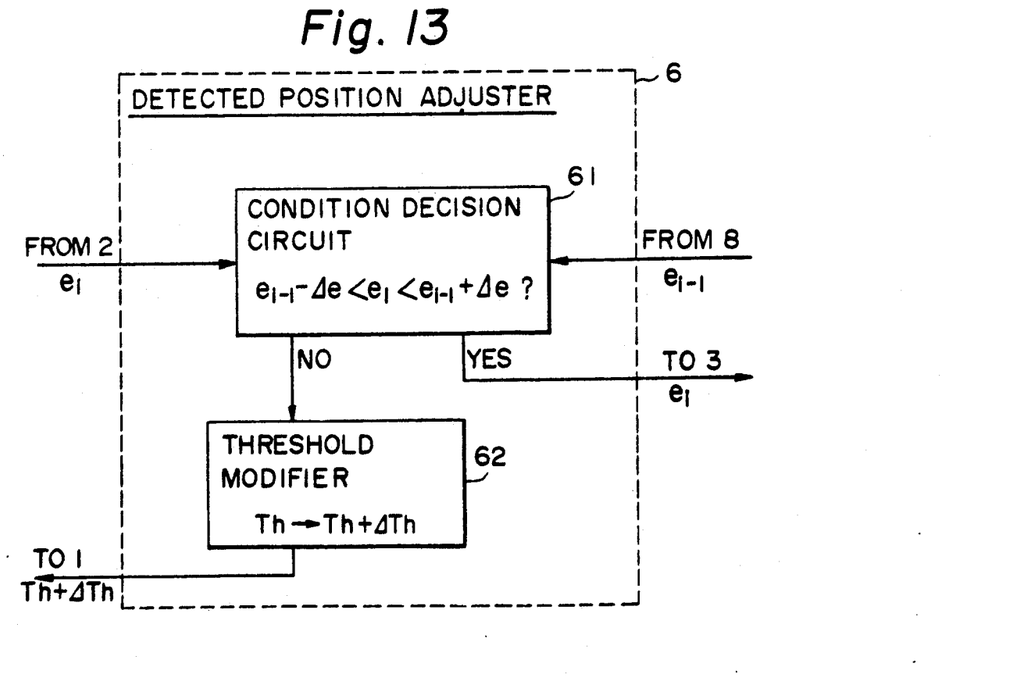
FIG. 13 is a block diagram illustrating an example of a detected position adjuster employed in the example shown in FIG. 12.

With reference to FIG. 13, the detected position detector 6 comprises a condition decision circuit 61 and a threshold modifier 62. In the condition decision circuit 61, it is judged whether or not the value $e_{i-1}$ of the parameter e in the immediately preceding frame from the memory 8 and the value $e_i$ thereof in the current frame from the position information detector 2 are met with the following condition:

$$e_{i-1} - \Delta e < e_i < e_{i-1} + \Delta e$$

If this condition is satisfied, the value $e_i$ is applied to the position information organizer 3. However, in a case where the condition is not satisfied, a new threshold value Th+$\Delta$Th is produced from a threshold value Th in the threshold modifier 62 to apply it to the feature picture generator 1. In place of the reprocessing operation in the feature picture generator 1, the value $e_{i-1}$ of the immediately preceding frame stored in the memory 8 may be employed as the value of the current frame when the condition is not satisfied. This is suitable for a case where a processing time for one frame is limited to a short time slot so that the processing operation starting from the feature picture generator 1 cannot be twice repeated.

The above description for the structure and operations of the detected position adjuster 6 are also applicable to those of the detected shape adjuster 7.

In this way, intelligent coding of a motion picture can be performed retaining consistency in changes in the position or shape of each element.

The above has described a method of analyzing an input picture signal and that position information and shape information of each element are handled separately in representing a motion picture. Now, a description will be given of a method of synthesizing a motion picture, that is, a method for reproducing a motion picture signal on the basis of the position and shape information which are the results of analysis. In intelligent coding it is a prerequisite that information about a three-dimensional shape of an object (the head of a person in this case) has been prepared both at the transmitting and receiving sides, as a three-dimensional shape model which is represented in a wire frame, for instance. It is also necessary that information about the luminance and a chrominance assigned to this three-dimensional shape model is sent to the receiving side in advance. The position and the shape of the portion of the three-dimensional shape model corresponding to each element are changed in accordance with the position and shape change information of each element sent from the transmitting side, and then the corresponding luminance and chrominance are assigned to the model. Thus, a picture is reproduced (or synthesized).

Concerning intelligent coding of a picture signal, only present invention has clarified that position information and shape information must be handled separately in intelligent coding and how such information is extracted from an input picture signal, and accordingly intelligent coding can be implemented in practice. In particular, the present invention permits representation and transmission of a motion picture signal with a small amount of information while retaining consistency in position and configuration changes of each element, and hence the invention is of great utility.

What we claim is:

1. An intelligent coding system for a picture signal, comprising: a feature picture generator for extracting features of a picture from a digitized picture signal; a position information detector whereby the position of each element forming the picture on the display screen is obtained from the output of the feature picture generator; a shape information detector for detecting the shape of each element; a position information organizer for organizing, in numerical form, the position information obtained from the position information detector; and a shape information organizer for organizing, in numerical form, the shape information obtained from the shape information detector; wherein the organized results obtained from the position information organizer and the shape information organizer are provided as an intelligent coding output of the picture signal.

2. An intelligent coding system according to claim 1, wherein the shape information organizer is arranged so that the shape information is separated into absolute information peculiar to each element, such as the size and the degree of inclination thereof, and relative information representative of the degree of a change in its shape.

3. An intelligent coding system for a picture signal, comprising: a feature picture generator for extracting features of a picture from a digitized moving picture signal; a position information detector whereby the position of each element forming the picture on the display screen is obtained from the output of the feature picture generator; a shape information detector for detecting the shape of each element; a position information organizer for organizing the position information numerically; a shape information organizer for organizing the shape information numerically; memories for storing, for at least one frame period, the organized results obtained from the position information organizer and the shape information organizing; and a detected position adjuster and a detected shape adjuster obtained in the current frame are adjusted to be consistent with position information and shape information of previous frames obtained from the memories; wherein the results of adjustment of the detected position information and the detected shape information by the detected position adjuster and the detected shape adjuster are organized numerically by the position information organizer and the shape information organizer and the numerical values thus obtained are provided as an output of intelligent coding of the picture signal.

* * * * *